United States Patent [19]

Ballova et al.

[11] 3,919,355
[45] Nov. 11, 1975

[54] METHOD FOR PREPARING SHOCK-RESISTANT GRAFTED COPOLYMERS OF STYRENE OR VINYLTOLUENE WITH SYNTHETIC RUBBER

[76] Inventors: Galina Dmitrievna Ballova, Prospekt Energetikov, 60, kv. 198; Ekaterina Ivanovna Egorova, Piskarevsky prospekt 9, korpus 3, kv. 85; Klavdiya Andreevna Sivograkova, ulitsa Vasenko, 5/15, kv. 52; Georgy Lazarevich Bezborodko, Piskarevsky prospekt, 9, korpus 3, kv. 94; Mariya Moiseevna Lebedeva, Skobelevsky prospekt, 5, kv. 122, all of Leningrad; Irina Ivanovna Rusinovskaya, Gatchina, ulitsa Gagarina, 16, kv. 26, Leningradskya oblast; Larisa Fedorovna Maladzyanova, Svetlanovsky prospekt, 72/1, kv. 174, Leningrad; Vladimir Nikolaevich Maximov, Kurlyandskaya ulitsa, 27, kv. 47, Leningrad; Tamara Nikolaevna Ostrovskaya, prospekt Energetikov, 34, kv. 43, Leningrad, all of U.S.S.R.

[22] Filed: Aug. 15, 1974

[21] Appl. No.: 497,635

[52] U.S. Cl. .................... 260/880 R; 260/31.2 MR; 260/33.6 AQ
[51] Int. Cl.² ........................................ C08L 47/00
[58] Field of Search ....... 260/880 R, 84.3, 31.2 MR, 260/33.6 AQ

[56] References Cited
UNITED STATES PATENTS

| | | | |
|---|---|---|---|
| 3,188,364 | 6/1965 | Brown | 260/880 R |
| 3,309,422 | 3/1967 | Doak | 260/880 R |
| 3,373,227 | 3/1968 | Finestone | 260/880 R |
| 3,428,712 | 2/1969 | Carrock | 260/31.2 MR |

*Primary Examiner*—Paul R. Michl
*Attorney, Agent, or Firm*—Waters, Schwartz & Nissen

[57] ABSTRACT

The method for preparing shock-resistant grafted copolymers of styrene or vinyltoluene with synthetic rubber consists in dissolution of synthetic rubber in styrene or vinyltoluene at a temperature of 20° to 80°C with subsequent heating of the obtained solution at a temperature 85-125°C in the presence of a plasticizer and a regulator of molecular weight till the conversion of the starting styrene or vinyltoluene is 25-40 per cent with the formation of pre-polymer, which undergoes suspension-polymerization by heating in an aqueous medium to a temperature not above 140°C at the ratio of the pre-polymer to water of 5:3 to 10:3, respectively in the presence of initiators of polymerization and a stabilizing system, consisting of 0.15–1.5 per cent by weight of tricalcium phosphate, 0.003–0.02 per cent by weight of a mixture of sodium salts of secondary alkylsulphates, having the general formula R—$OSO_3Na$, where R is a hydrocarbon radical having from 8 to 18 carbon atoms, and 0.15–0.35 per cent by weight of calcium carbonate, which is introduced into the suspension-polymerization process at a temperature not above 90°C.

8 Claims, No Drawings

METHOD FOR PREPARING SHOCK-RESISTANT GRAFTED COPOLYMERS OF STYRENE OR VINYLTOLUENE WITH SYNTHETIC RUBBER

This invention relates to the method for preparing shock-resistant grafted copolymers of styrene or vinyltoluene with synthetic rubber.

Said copolymers, owing to the set of valuable properties inherent in them, are widely used in the manufacture of various industrial articles and consumer's goods. For example, they are used in the manufacture of automobile articles, cabinets and parts of radio receivers, TV sets, tape recorders, various illumination articles, inner lining of refrigerators, containers for food, and many other articles.

Shock-resistant grafted copolymers of styrene with rubber possessing the optimum structure and the best physicomechanical properties are prepared by the mass-suspension method incroporating stages of dissolution of rubber in styrene, heating of the thus-obtained solution to ensure the conversion of 25–40 per cent (pre-polymerization) of the monomer, and water-suspension polymerization of the pre-polymer.

Known in the prior art is the method for preparing shockresistant grafted copolymers of styrene. The method consists in dissolution of butadiene rubber in styrene, for example at a temperature of not above 80C with subsequent heating of the obtained solution at a temperature of 60 – 130C in the presence of a plasticizing agent and an agent controlling the molecular weight till the conversion of styrene is 25–40 per cent with the formation of pre-polymer. The obtained pre-polymer is polymerized in an aqueous suspension at a temperature not above 145C in the presence of initiators of polymerization and a stabilizin system consisting of hydroxy ethylcellulose (0.024 – 1.5 per cent by weight) and sodium dodecyl benzoylsulphate (0.001 – 0.01 per cent by weight). The suspension polymerization is carried out at the ratio of the pre-polymer to water of 1:2 to 5:4, respectively.

The main disadvantage of the above method is comparatively low efficiency of the process since the selected stabilizing system makes it impossible to carry out the suspension polymerization process at the ratio of the pre-polymer ("oil" phase) to water ("water" phase) higher than 5:4 respectively. This is due to the high viscosity of the system in the process of suspension polymerization of the monomer with rubber and the difficulty of removing heat, which very often, (at a small ratio of the pre-polymer to water, in particular) results in partial or complete agglomeration of the system.

Another disadvantage of this method is large amounts of effluents which are also due to the employed rations of the oil phase to water phase.

The object of this invention is to work out a method for preparing shock-resistant grafted copolymers of styrene or vinyltoluene with synthetic rubber which would make it possible to synthesize said copolymers of high quality at high efficiency of the process.

Another object of the invention is to minimize the quantity of effluents.

In accordance with these and other objects, the invention consists in that the method for preparing shock-resistant grafted copolymers of styrene or vinyltoluene with synthetic rubber is effected by dissolving rubber in styrene or vinyltoluene at a temperature not above 80C with subsequent heating of the obtained solution at a temperature of 85 – 125C in the presence of a plasticizing agent and an agent controlling the molecular weight of the copolymer to ensure the conversion of styrene or vinyltoluene of 25–40 per cent with the formation of a pre-polymer and suspension polymerization of the pre-polymer by heating it in an aqueous medium to the temperature not above 140C in the presence of initiators of polymerization and a stabilizing system.

According to the invention, the suspension polymerization of the pre-polymer is carried out at the ratio of the pre-polymer to water of 5:3 to 10:3, respectively, using the stabilizing system, consisting of 0.15 – 1.5 per cent by weight of tricalcium phosphate, 0.003 – 0.02 per cent by weight of a mixture of sodium salts of secondary alkylsulphates, having the general formula R-OSO$_3$Na, where R is a hydrocarbon radical having from 8 to 18 carbon atoms, and 0.15 – 0.35 per cent by weight of calcium carbonate, which is introduced into the process of the suspension polymerization at a temperature not above 90C.

The use of the stabilizing system according to the invention considerably increases the stability of the process at the stage of suspension polymerization, which in turn makes it possible to reduce sharply the ratio of the pre-polymer to water.

In order to improve the stability of the suspension with respect to both direct (oil into water) and inverse (water into oil) loading, and in order to obtain the product of higher purity, it is recommendable to carry out the suspension polymerization of the pre-polymer in the presence of 0.2 – 0.7 per cent by weight of tricalcium phosphate, 0.003 – 0.008 per cent by weight of secondary sodium alkylsulphate and at the ratio of the pre-polymer to water from 5:3 to 9:3.

The proposed method for preparing shock-resistant grafted copolymers of styrene or vinyltoluene with synthetic rubber is very simple in realization, the conditions of the process can be varied (temperature and ingredient concentrations); the process is characterized by high efficiency which ensures the yields of the product 13–39 per cent by weight higher as compared with the known process, the ratio of the pre-polymer to water being from 5:3 to 10:3 as compared with the known ratio of 5:4. The method makes it possible to prepare shock-resistant grafted copolymers of high quality, characterized by valuable physico-mechanical properties with considerably low content of rubber (4–6 per cent by weight), low content of residual monomer (less than 0.1 – 0.2 per cent by weight) and good fluidity. Making use of vinyltoluene, consisting for example of 27–35 per cent by weight of ortho- and 73 – 65 per cent by weight of paraisomers, instead of styrene, during copolymerization with rubber, makes it possible to elevate the softening point of the shock-resistant polymers at about 15C which is especially valuable in the manufacture of articles requiring increased heat resistance and strength.

Moreover, the advantage of the proposed method consists in that the amount of effluents is reduced, too.

The proposed method can be realized as follows.

Rubber, for example polybutadienes of various structures, butadienestyrene, isoprene and pentadiene (piperylene) rubbers, block-copolymers of styrene with divinyl, or isoprene with divinyl, is dissolved in styrene or vinyltoluene (for example, 65 per cent of meta- and 35 per cent of para-isomers; 27–35 per cent of ortho and 73–65 per cent of para-isomers) at a temperature not above 80C to complete dissolution of rubber with constant stirring. Then pre-polymerization is carried out en masse of the obtained solution in the presence of a plasticizing agent (medicinal vaseline oil or butyl stearate), regulator of molecular weight (normal laurylmercaptane) and the initiator of polymerization, benzoyl peroxide (the polymerization temperature is 85–90, preferably 90C) or in the absence of the initiator agent (the temperature of 115–125C) preferably 120C). The pre-polymerization is carried out till the conversion of the monomer is 25–40 per cent, which takes about 2–4 hours. The obtained pre-polymer is polymerized in the aqueous suspension at the ratio of the pre-polymer to water of 5– 3 to 10:3. The water-suspension polymerization is carried out at constant stirring for 5–8 hours (including the period during which the temperature rises to from 20 to 140C, preferably to 130C, and a 1–2 hour retention at this temperature) in the presence of initiators and stabilizing agents. The stabilizing system consists of tricalcium phsophate (0.15–1.5 per cent by weight), secondary sodium alkylsulphate (0.003 – 0.02 per cent by weight) and calcium carbonate (0.15 – 0.35 per cent by weight), which is introduced into the suspension-polymerization process at a temperature not above 90C.

The secondary alkylsulphates of sodium having the general formula $R-OSO_3Na$, where R is a hydrocarbon radical containing from 8 to 18 carbon atoms, are prepared by sulphonation of olefines with subsequent neutralization. They are used as an aqueous solution having the concentration from 20 to 30 per cent. The suspension of the pre-polymer in water, which contains the stabilizing system, can be prepared by loading the pre-polymer into water and also by pouring water into the pre-polymer.

For a better understanding of the invention, the following examples of its practical embodiment are given by way of illustration.

EXAMPLE 1.

An autoclave of 50 litre capacity provided with a paddle stirrer is loaded (with constant stirring) by styrene and butadiene rubber. The rubber is then dissolved at a temperature of 80C for 2–3 hours, and a plasticizing agent, vaseline oil, and benzoyl peroxide (0.11 per cent by weight) are added. The temperature is raised to 90C, and the regulator of molecular weight, normal laurylmercaptane is added in equal portions every hour beginning from the start of polymerization. Pre-polymerization is carried out in a medium of nitrogen for 3–4 hours until the conversion of the monomer is 25–40 per cent.

The prepared pre-polymer (without cooling) is pumped into another reactor provided with a stirrer, filled with an aqueous phase containing calcium phosphate (prepared by pouring together a solution of sodium phosphate and calcium chloride) along with the secondary sodium alkylsulphate. The ratio of the pre-polymer to the water phase is 5:3 (by volume).

Composition of the Batch, (in per cent by weight):

| "Oil" phase | | "Water" phase | |
|---|---|---|---|
| styrene | 143.6 | water | 98.5 |
| butadiene rubber | 7.70 | calcium phosphate | 1.5 |
| medicinal vaseline oil | 3.1 | | |
| benzoyl peroxide | 0.31 | secondary sodium alkyl sulphate | 0.003 |
| normal laurylmercaptane | 0.046 | | |
| tert.-butyl perbenzoate | 0.19 | calcium carbonate | 0.15 |

After loading the pre-polymer into the water-phase (the temperature of the suspension not above 40–50C), tert.-butyl perbenzoate and 0.2 per cent of benzoyl peroxide are added.

The reactor contents are then blown through with nitrogen and the temperature is raised to 130C within 6 hours. During this period, at the point when the temperature attains the level of 90C, calcium carbonate is added. When the temperature is raised to 130C, the mixture is kept at this temperature for two hours.

The process is characterized by stability. Sticking of the reaction mixture to the reactor walls or paddles of the stirrer is practically absent. On the termination of the reaction, the polymer is washed off the stabilizing agent by hydrochloric acid to decompose $Ca_3(PO_4)_2$, then centrifuged and dried. The prepared product possesses high physico-mechanical properties:

Sharply impact strength in samples with notches not less than 12 kg.cm/sq.cm

| | |
|---|---|
| Residual monomer | 0.04 per cent w/w |
| Specific elongation at break | 38 per cent |
| Vicat softening point | 100C |
| Yield of product | 24.6 kg |

EXAMPLE 2

The process is carried out under conditions similar to those described in Example 1, except that butadiene styrene rubber is used as the starting rubber, pre-polymer is cooled to 20–30C, after which the initiating agent (benzoyl peroxide and tert. butyl perbenzoate) is introduced into it and in 15 – 30 minutes the aqueous phase (which contains the stabilizing system) is pumped.

Sharpy impact strength in samples with notches 10 kg.cm/sq.cm

| | |
|---|---|
| Residual monomer | 0.02 per cent w/w |
| Specific elongation at break | 32 per cent |
| Vicat softening point | 101C |
| Yield of product | 24.7 kg |

EXAMPLE 3

The process is carried out under conditions similar to those in Example 1, except that the ratio of the pre-polymer to the aqueous phase is 6:3, tricalcium phosphate is taken in the quantity of 0.15 per cent by weight, the secondary sodium alkylsulphate 0.008 per cent by weight and calcium carbonate 0.20 per cent by weight.

The conditions for the suspension polymerization: step-wise rise of temperature: to 90C - one hour, retention at 90C - one hour, temperature rise to 105C - one hour, temperature rise 115C - one hour, to 130C - one hour, and retention at 130C - one hour.

The process is characterized by stability. Sticking to the apparatus walls is practically absent. The physico-mechanical properties of the obtained product are the same as specified for the polymer prepared in Example 1.

The yield of the product is 26.2 kg.

EXAMPLE 4.

The process is carried out under conditions similar to those described in Example 1, except that vinyltoluene having the composition of 35 per cent by weight of ortho- and 65 per cent by weight of para-isomers, is used instead of styrene.

The process is characterized by stability.

Sticking to the apparatus walls is practically absent.

The obtained product possesses high physico-mechanical properties:

Sharpy impact strength in samples with notches

| | |
|---|---|
| | 10–11 kg.cm/sq.cm |
| Residual monomer | 0.08 per cent w/w |
| Specific elongation at break | 30 per cent |
| Vicat softening point | 115C |

The yield of the product is 24.5 kg

EXAMPLE 5

The process is carried out under the same conditions as in Example 1, except that the ratio of the pre-polymer to the water phase is 9:3, tricalcium phosphate is taken in the quantity of 0.5 per cent by weight, secondary sodium alkylsulphate 0.01 per cent by weight and calcium carbonate 0.3 per cent by weight.

The conditions of the suspension polymerization of the pre-polymer: temperature rise (stepwise): to 90C - 90 minutes, retention at 90C - one hour, temperature rise to 100C - one hour, retention at this temperature - one hour, temperature rise to 130C - 2.5 hours, and retention at the temperature of 130C - one hour.

The process is characterized by stability, the reaction mixture does not practically stick to the apparatus walls or the stirrer. The physico-mechanical properties of the obtained product are as specified in Example 1.

The yield of the product is 29.5 kg.

EXAMPLE 6

The process is carried out under conditions similar to those described for Example 1, except that the ratio of the pre-polymer to the water phase is 10:3, tricalcium phosphate is taken in the quantity of 0.7 per cent by weight, secondary sodium alkylsulphate 0.02 per cent by weight and calcium carbonate 0.35 per cent by weight.

The process is characterized by stability. The reaction mixture does not practically stick to the apparatus walls. The physico-mechanical properties of the obtained polymer are the same as specified in Example 1.

The yield of the polymer is 30.3 kg.

EXAMPLE 7

The process is carried out under conditions similar to those described in Example 5, except that vinyltoluene having the composition of 35 per cent by weight of para- and 65 per cent by weight of the meta-isomers is used instead of styrene.

The process is characterized by stability. The reaction mixture does not practically stick to the apparatus walls, or the stirrer.

The physico-mechanical properties of the polymer are as follows:

Sharpy impact strength in samples with notches

| | |
|---|---|
| | 12–13 kg.cm/sq.cm |
| Specific elongation at break | 40 per cent |
| Vicat softening point | 75C |
| Residual polymer | 0.05 per cent w/w |

The yield of the product is 29.6 kg

EXAMPLE 8

The process is carried out under conditions similar to those described in Example 1, except that the step pre-polymerization is accomplished in the absence of the initiator at a temperature of 120C in the course of 3–4 hours till the conversion of the monomer is 25–30 per cent. The physico-mechanical properties of the polymer are as follows:

Sharpy impact strength in samples with notches not less than

| | |
|---|---|
| | 9 kg.cm/sq.cm |
| Specific elongation at break | 30 per cent |
| Residual monomer | 0.05 per cent w/w |

EXAMPLE 9

The process is carried out under conditions similar to those described in Example 1, except that block-copolymer of styrene and divinyl (ratio 40:60 by weight, respectively) is used as the starting rubber in the quantity of 10.6 per cent by weight.

The process is characterized by stability; the reaction mixture does not practically stick to the apparatus walls.

The physico-mechanical properties of the polymer are as follows:

Sharpy impact strength in samples with notches

| | |
|---|---|
| | 8–10 kg.cm/sq.cm |
| Specific elongation at break | 32 per cent |
| Residual monomer | 0.03 per cent |
| Vicat softening point | 101C |

EXAMPLE 10 (Check)

The process is carried out under conditions similar to those described in Example 1, except that the ratio of the pre-polymer to the water phase is 5:4. The process is characterized by stability. The reaction mixture does not practically stick to the apparatus walls. The physico-mechanical properties of the polymer are the same as specified in Example 1.

The yield of the product is 21.8 kg, that is about 13 per cent lower than in Example 1.

What is claimed is:

1. A method for preparing shock-resistant grafted co-polymers of styrene with synthetic rubber, consisting in that rubber is dissolved in styrene at a temperature of 20 to 80C, the obtained solution is heated at a temperature of 85–125C in the presence of a plasticizer and a regulator of molecular weight until the conversion of styrene is 25–40 per cent with formation of pre-polymer; the pre-polymer undergoes suspension-polymerization by heating in an aqueous medium to the temperature not above 140C at the ratio of the pre-polymer ot water of 5:3 to 10:3 respectively in the presence of the polymerization initiators and a stabilizing system, consisting of 0.15 – 1.5 per cent by weight of tricalcium phosphate, 0.003 – 0.02 per cent by weight of a mixture of sodium salts of secondary alkylsulphates having the general formula R—OSO$_3$Na, where R is a hydrocarbon radical, containing from 8 to 18 carbon atoms, and 0.15–0.35 per cent by weight of calcium carbonate, which is introduced into the process of suspension polymerization at a temperature not above 90°C.

2. A method for preparing shock-resistant grafter copolymers of vinyltoluene with synthetic rubber consisting in dissolution of rubber in vinyltoluene at a temperature of 20 to 80C, heating the obtained solution at a temperature from 85 to 125C in the presence of a plasticizer and a regulator of molecular weight until the conversion of vinyltoluene is 25–40 per cent with formation of pre-polymer; suspension polymerization of the pre-polymer by heating it in an aqueous medium to the temperature not above 140C at the ratio of the pre-polymer to water of 5:3 to 10:3 respectively in the presence of initiators of polymerization and a stabilizing system consisting of 0.15 – 1.5 per cent by weight of tricalcium phosphate, 0.003 – 0.02 per cent by weight of a mixture of sodium salts of secondary alkylsulphates, having the general formula R—OSO$_3$Na, where R is a hydrocarbon radical having from 8 to 18 carbon atoms, and 0.15–0.35 per cent by weight of calcium carbonate, which is introduced in the process of suspension polymerization at a temperature not above 90C.

3. A method according to claim 1, in which tricalcium phsophate is taken in the quantity of 0.2–0.7 per cent by weight.

4. A method according to claim 2, in which tricalcium phosphate is taken in the quantity of 0.2–0.7 per cent by weight.

5. A method according to claim 1, in which a mixture of sodium salts of secondary alkylsulphates is taken in the quantity of 0.003–0.008 per cent by weight.

6. A method according to claim 2, in which a mixture of sodium salts of secondary alkylsulphates is taken in the quantity of 0.003 – 0.008 per cent by weight.

7. A method according to claim 1, in which the suspension polymerization of the pre-polymer is carried out at the ratio of the prepolymer to water from 5:3 to 9:3.

8. A method according to claim 2, in which the suspension polymerization of the pre-polymer is carried out at the ratio of the pre-polymer to water from 5:3 to 9:3.

* * * * *